3,082,202
3-ACETAMIDO-2,4,6-TRIIODO-5-METHYLSUL-
FONAMIDOHIPPURIC ACID
Mathew D. Madsen, Webster Groves, and Douglas W.
Chapman, Greendale, Mo., assignors to Mallinckrodt
Chemical Works, St. Louis, Mo., a corporation of
Missouri
No Drawing. Filed Dec. 16, 1960, Ser. No. 76,097
3 Claims. (Cl. 260—211)

This invention relates to organic compounds and more particularly to certain novel alkylsulfonamidobenzoyl compounds.

Briefly, the present invention is directed to certain novel meta-alkylsulfonamido-2,4,6-triiodobenzoyl amino acids and derivatives thereof. The invention also includes certain novel intermediates and methods used in the preparation thereof.

Among the objects of the invention may be mentioned the provision of new alkylsulfonamidobenzoyl compounds; the provision of new 3-lower alkanamido-5-lower alkylsulfonamido - 2,4,6 - triiodobenzamido-lower alkanoic acids; the provision of new compounds which are useful chemical intermediates in the preparation of compounds of the type mentioned; the provision of new compounds which are useful for the preparation of roentgenographic contrast media; and the provision of methods of preparing novel alkylsulfonamidobenzoyl derivatives of the type mentioned. Other objects and features will be in part apparent and in part pointed out hereinafter.

The invention accordingly comprises the products and methods hereinafter described, the scope of the invention being indicated in the following claims.

The present invention is directed to the novel alkylsulfonamidobenzoyl compounds represented by the formula:

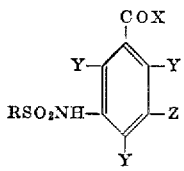

where X is a halogen or an aminoalkanoic acid residue of the formula —NH·A·COOM, A being a lower alkylene group and M being a pharmaceutically acceptable cation; Y is hydrogen or iodine, Z is —NO$_2$, —NH$_2$ or —NHCOR'; and R and R' are lower alkyl groups. The invention also includes methods of preparing the novel compounds of the class described.

The following are illustrative of lower alkylene groups as represented by A in the above formula:

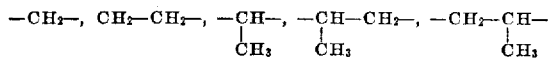

The term "pharmaceutically acceptable cations" as used in the above description, includes but is not limited to hydrogen, sodium, N-methylglucamine and diethanolamine.

The 3-lower alkanamido-5-lower alkylsulfonamido-2,4,6-triiodobenzamido-lower alkanoic acids of the present invention are useful for the preparation of roentgenographic contrast media. For example, concentrated sterile aqueous solutions of the salts of these acids with nontoxic cations are of low toxicity and contain a high concentration of organically bound and substantially physiologically inert iodine which can be administered intravascularly. The lower members of the series are excreted primarily by way of the urinary system. The sodium and N-methylglucamine salts are particularly useful for the preparation of solutions for intravascular injection in connection with vasographic X-ray techniques, such as arteriography and venography. Such solutions are also useful in techniques for visualizing structures of the excretory system.

Dispersions of water insoluble derivatives of these acids, such as their esters, are also useful as for example, in visualizing hollow organs and cavities having external orifices through which the contrast preparation can be introduced in preparation for the examination and removed after the examination is completed.

The compounds are also useful for the preparation of other types of contrast media, such as for example, nonaqueous dispersions.

Methods of synthesizing the 3-lower alkanamido-5-lower alkylsulfonamido - 2,4,6 - triiodobenzamido-lower alkanoic acids of the invention are exemplified by the following procedure used in preparing one species, 3-acetamido - 5 - methylsulfonamido-2,4,6-triiodohippuric acid.

The starting material is 5-methylsulfonamido-3-nitrobenzoic acid, which may be prepared by the method described in the copending coassigned application Serial No. 746,072, of De La Mater and Wiegert, filed July 2, 1958, now Patent 3,036,063, dated May 22, 1962. In this method 5-amino-3-nitrobenzoic acid is condensed with methanesulfonyl chloride in a dioxane medium in the presence of a small amount of pyridine. The reaction mixture is poured into an excess of ammonia solution and the resulting mixture is neutralized. Precipitated methanesulfonamide is filtered off and the filtrate is acidified to precipitate crude 5-methylsulfonamido - 3 - nitrobenzoic acid, which is separated and purified.

5-methylsulfonamido-3-nitrobenzoic acid is treated with thionyl chloride to form 5-methylsulfonamido-3-nitrobenzoyl chloride. This is condensed with sodium aminoacetate to form 5-methylsulfonamido-3-nitrohippuric acid. The nitro group is then reduced by a suitable method, such as catalytic hydrogenation, and the resulting 3-amino-5-methylsulfonamido-hippuric acid is then exhaustively iodinated by treatment with a suitable agent, such as iodine monochloride or potassium iododichloride. The resulting 3-amino-5-methylsulfonamido-2,4,6-triiodohippuric acid is then acetylated to yield 3-acetamido - 5 - methylsulfonamido-2,4,6-triiodohippuric acid. The acetylation has been accomplished successfully in dimethylacetamide solution using acetic anhydride as the acetylating agent.

Other 3-lower alkanamido-5-lower alkylsulfonamido-2,4,6-triiodobenzamido-lower alkanoic acids may be prepared by methods similar to that described above by varying the starting material, the amino acid and the acylating agent used. For example, in place of 5-methylsulfonamido-3-nitrobenzoic acid other 5-lower alkyl-sulfonamido-3-nitrobenzoic acids, such as 5-ethylsulfonamido- or 5-propylsulfonamido-3-nitrobenzoic acid may be treated with thionyl chloride or similar acyl halide-forming agents, such as phosphorus trichloride, to form the corresponding 5-lower alkylsulfonamido-3-nitrobenzoyl chloride. In place of sodium aminoacetate, other aminoalkanoic acid salts such as the sodium or potassium salts of alpha- or beta-alanine or of alpha-, beta-, or gamma-amino-butyric acids may be used. Other acylating agents which may be used in place of acetic anhydride include the anhydrides or acyl halides of propionic and butyric acids.

The following examples illustrate the invention.

EXAMPLE 1

*5-Methylsulfonamido-3-Nitrobenzoyl Chloride*

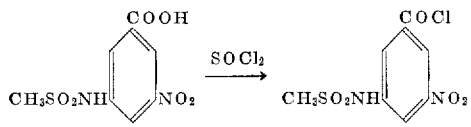

5-methylsulfonamido-3-nitrobenzoic acid was prepared by the method described in the copending, coassigned application Serial No. 746,072, of De La Mater and Wiegert, filed July 2, 1958, now Patent 3,036,062, dated May 22, 1962. Thionyl chloride (1 liter) was added to 5-methylsulfonamido-3-nitrobenzoic acid (174 g., 0.67 mole), prepared as described above. The reaction mixture was heated under reflux for 4½ hours, after which the solution was chilled and the 5-methylsulfonamido-3-nitrobenzoyl chloride collected and washed with a small amount of benzene. The product was dried in a vacuum over sodium hydroxide. Yield, 149 g. (80%). Melting point, 168.5–169.5° C. (corrected).

EXAMPLE 2

*5-Methylsulfonamido-3-Nitrohippuric Acid*

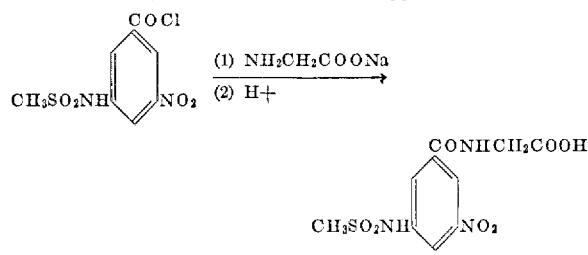

Glycine (60.5 g., 0.8 mole) was dissolved in a solution of sodium hydroxide (48.4 g., 1.2 mole) in water (540 ml.). 5-methylsulfonamido-3-nitrobenzoyl chloride (149 g., 0.54 mole) was added in portions to the stirred alkaline sodium aminoacetate solution, which was maintained at a temperature of 0–5° C. About the midpoint of the addition, 100 g. of 50% sodium hydroxide solution was added. The solution was stirred an additional 15 minutes then neutralized and filtered. The filtrate was then acidified to Congo red and the resulting precipitate collected. This crude product was purified by a double precipitation by acidifying a solution of its sodium salt. Yield of 5-methylsulfonamido-3-nitrohippuric acid, 132.5 g. (78.5%). Melting point, 249.1–250.1° C. (corrected). Calculated for $C_{10}H_{11}N_3O_7S$: Neutral equivalent, 317. Found: Neutral equivalent, 321.

EXAMPLE 3

*3-Amino-5-Methylsulfonamidohippuric Acid*

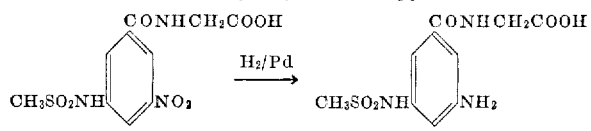

An aqueous solution of 5-methylsulfonamido-3-nitrohippuric acid (120 g., 0.38 mole) at pH 6 was hydrogenated at low pressure using Pd/C catalyst. After reduction was complete the catalyst was filtered off, and the solution of 3-amino-5-methylsulfonamidohippuric acid was used in the next step.

EXAMPLE 4

*3-Amino-2,4,6-Triiodo-5-Methylsulfonamidohippuric Acid*

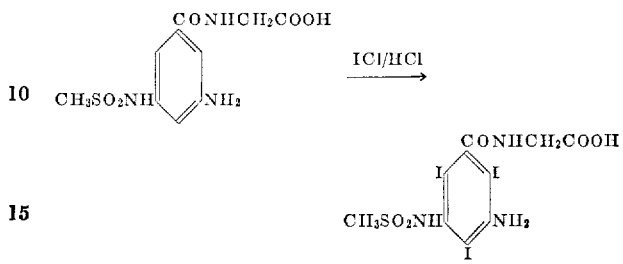

The aqueous solution of 3-amino-5-methylsulfonamidohippuric acid from Example 3 was added to a solution of hydrochloric acid (250 ml. concentrated acid diluted with 1500 ml. of water). To this was added a solution of 95% iodine monochloride (204 g.) in concentrated hydrochloric acid (204 ml.). The reaction mixture was diluted to a volume of 3800 ml. and stirred and heated on a steam bath for 2 days. The excess iodine monochloride was then reduced with sodium bisulfite, and the reaction mixture was chilled and the product collected. The crude product was dissolved in 1500 ml. of hot sodium hydroxide solution, the pH was adjusted to 6, and the solution was treated with decolorizing charcoal and filtered. The filtrate was acidified to Congo red with concentrated hydrochloric acid, then chilled, and the product collected and dried. Yield of 3-amino-2,4,6-triiodo-5-methylsulfonamidohippuric acid, 158.5 g. Melting point, 162.5–165.5° C. (corrected). Calculated for $C_{10}H_{10}N_3O_5SI_3$: Neutral equivalent, 665. Found: Neutral equivalent, 674–679.

EXAMPLE 5

*3-Acetamido-2,4,6-Triiodo-5-Methylsulfonamidohippuric Acid*

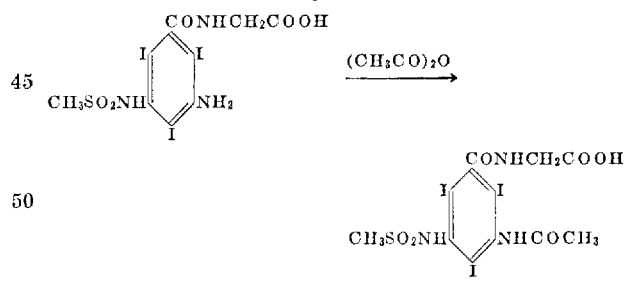

Acetic anhydride (100 ml.) and concentrated sulfuric acid (5 drops) were added to 3-amino-2,4,6-triiodo-5-methylsulfonamidohippuric acid (50 g.). The mixture was heated on a steam bath and dimethylacetamide (75 ml.) was added, producing a homogeneous solution. After 2 hours, the solution was heated to 110–120° C. for ten minutes, then poured into water (300 ml.) The clear solution was evaporated to about 75 ml., yielding a syrup which was poured into hot water (350 ml.) The solution was at first clear, but after a time crystallization began. The mixture was chilled, and the crude product was collected, washed and dried. Yield, 34.5 g. This crude product was purified by a triple precipitation of the free acid from a solution of its sodium salt. Yield of purified 3-acetamido-2,4,6-triiodo-5-methylsulfonamidohippuric acid, 20.5 g. (38.5%). The compound decomposes at 250.5° C. (corrected). Calculated for $$C_{12}H_{12}N_3O_6SI_3$$

Neutral equivalent, 353.5. Found: Neutral equivalent, 351.

EXAMPLE 6

*3-Acetamido-2,4,6-Triiodo-5-Methylsulfonamidohippuric Acid, Sodium Salt*

The sodium salt of 3-acetamido-2,4,6,-triiodo-5-methylsulfonamidohippuric acid was prepared by conventional methods. The solubility of this salt in water at 25° C. is greater than 74% w./v.

The actuate intravenous $LD_{50}$ of this salt in mice was found to be approximately 20.4 g./kg.

3 - acetamido-2,4,6-triiodo-5-methylsulfonamidohippuric acid was dissolved in sufficient sodium hydroxide solution to yield a solution of pH 7.4 containing 300 mg. I/ml. The dissolved solids content of the solution was 58.5% w./v. Methyl paraben (0.1%) was added as a preservative, and the solution was pasteurized.

Intravenous administration of a solution of this salt produces good X-ray visualization of the kidneys of the dog.

EXAMPLE 7

*3-Acetamido-2,4,6-Triiodo-5-Methylsulfonamidohippuric Acid, N-Methylglucamine Salt*

The N-methylglucamine salt of 3-acetamido-2,4,6-triiodo-5-methylsulfonamidohippuric acid was prepared by conventional methods. This salt is highly soluble in water, and intravenous administration of the solution of the salt produces good X-ray visualization of the kidneys of the dog.

It will be understood that in addition to the sequence of reactions outlined above, other routes may be used to prepare the 3-lower alkanamido - 5 - lower alkylsulfonamido-2,4,6-triiodobenzamido-lower alkanoic acids of the invention. The De La Mater and Wiegert patent, referred to above, discloses the preparation of a series of compounds, as indicated in the following sequence:

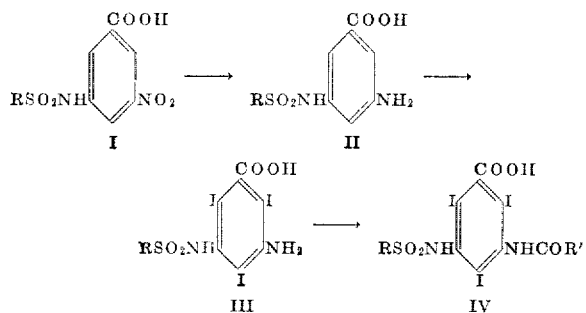

The preparation of compounds of this invention from compounds of type I above has already been illustrated.

Compounds of types II, III and IV might also be utilized as starting materials for the preparation of compounds of this invention by means of a similar series of reactions. For example, the following sequence may be used:

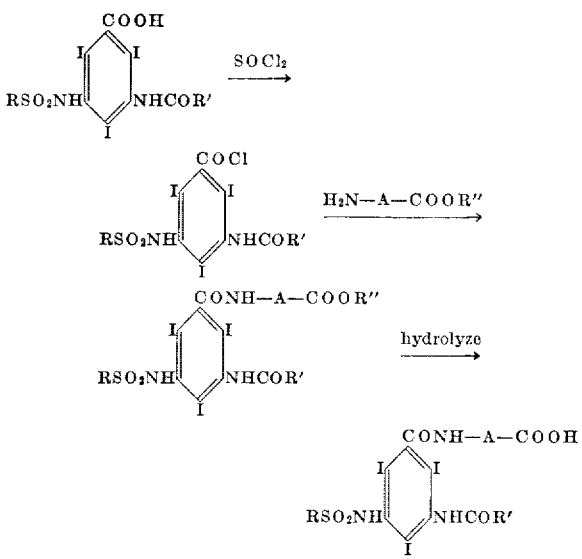

In the above sequence, R, R′ and R″ represent lower alkyl radicals and A represents a lower alkylene radical. Other possible reaction sequences will occur to those skilled in the art.

In view of the above, it will be seen that the several objects of the invention are achieved and other advantageous results obtained.

As various changes could be made in the above products and processes without departing from the scope of the invention it is intended that all matters contained in the above description shall be interpreted as illustrative and not in a limiting sense.

We claim:
1. 3-acetamido-2,4,6-triiodo - 5 - methylsulfonamidohippuric acid.
2. 3-acetamido-2,4,6-triiodo - 5 - methylsulfonamidohippuric acid, sodium salt.
3. 3-acetamido - 2,4,6-triiodo-5-methylsulfonamidohippuric acid, N-methyl glucamine salt.

References Cited in the file of this patent

Wagner et al.: Synthetic Organic Chemistry, pages 335, 567 and 654 (1953) (copy in Div. 38).

UNITED STATES PATENT OFFICE
CERTIFICATE OF CORRECTION

Patent No. 3,082,202  March 19, 1963

Mathew D. Madsen et al.

It is hereby certified that error appears in the above numbered patent requiring correction and that the said Letters Patent should read as corrected below.

Column 3, line 23, for "3,036,062" read -- 3,036,063 --.

Signed and sealed this 10th day of December 1963.

(SEAL)
Attest:
ERNEST W. SWIDER

Attesting Officer

EDWIN L. REYNOLDS

Acting Commissioner of Patents